United States Patent [19]

Maier et al.

[11] Patent Number: 5,275,854
[45] Date of Patent: Jan. 4, 1994

[54] SHAPED ARTICLES FROM ORIENTABLE POLYMERS AND POLYMER MICROBEADS

[75] Inventors: Larry K. Maier; Elizabeth K. Priebe, both of Rochester; Jong S. Lee, Pittsford; Paul E. Woodgate, Spencerport, all of N.Y.; Glenn C. Smith, Kingsport, Tenn.

[73] Assignee: Eastman Kodak Company, Rochester, N.Y.

[21] Appl. No.: 861,631

[22] Filed: Apr. 1, 1992

Related U.S. Application Data

[60] Continuation of Ser. No. 673,227, Mar. 21, 1991, Pat. No. 5,143,765, which is a continuation-in-part of Ser. No. 625,383, Dec. 11, 1990, Pat. No. 5,141,685, which is a division of Ser. No. 457,894, Dec. 27, 1989, Pat. No. 4,994,312.

[51] Int. Cl.$^5$ .................. B32B 3/26; D02G 3/00; B29C 67/24
[52] U.S. Cl. .................. 428/36.5; 215/1 R; 264/45.3; 264/210.6; 264/210.7; 264/210.8; 264/211; 264/288.8; 264/290.2; 264/290.5; 428/220; 428/314.4; 428/315.5; 428/317.9; 428/327; 428/372; 428/398; 428/401; 428/403; 428/910
[58] Field of Search ............ 428/36.5, 36.9, 220, 428/304.4, 314.4, 315.5, 317.9, 327, 332, 364, 376, 379, 398, 401, 403, 910; 215/1; 264/45.3, 537, 540, 210.6, 210.7, 210.8, 211, 288.8, 290.2, 290.5, DIG.

[56] References Cited

U.S. PATENT DOCUMENTS

| | | | |
|---|---|---|---|
| 2,465,319 | 3/1949 | Whinfield et al. | 526/71 |
| 2,901,466 | 8/1959 | Kibler et al. | 528/288 |
| 3,154,461 | 10/1964 | Johnson | 428/159 |
| 3,407,253 | 10/1968 | Yoshimura et al. | 428/219 |
| 3,515,625 | 6/1970 | Sedlak et al. | 428/317.9 |
| 3,615,972 | 10/1971 | Morehouse et al. | 156/79 |
| 3,630,990 | 12/1971 | Neal | 260/40 R |
| 3,640,944 | 2/1972 | Seppala et al. | 523/508 |
| 3,738,904 | 6/1973 | Ikeda et al. | 428/155 |
| 3,849,530 | 11/1974 | Wyeth et al. | 264/89 |
| 3,903,234 | 9/1975 | Ikeda et al. | 264/210 R |
| 3,944,699 | 3/1976 | Mathews et al. | 428/220 |
| 3,969,562 | 7/1976 | Suzuki | 428/155 |
| 4,303,708 | 12/1981 | Gebhardt et al. | 428/35 |
| 4,320,207 | 3/1982 | Watanabe et al. | 521/54 |
| 4,377,616 | 3/1983 | Ashcraft et al. | 428/213 |
| 4,420,607 | 12/1983 | Morris et al. | 528/298 |
| 4,459,402 | 7/1984 | Morris et al. | 528/298 |
| 4,468,510 | 8/1984 | Morris et al. | 528/298 |
| 4,496,620 | 1/1985 | Park et al. | 428/323 |
| 4,559,938 | 12/1985 | Metcalfe | 602/52 |

(List continued on next page.)

FOREIGN PATENT DOCUMENTS

| | | |
|---|---|---|
| 0293603 | 12/1988 | European Pat. Off. |
| 0311426 | 4/1989 | European Pat. Off. |
| 134755 | 5/1988 | Japan |
| 137973 | 6/1988 | Japan |
| 158629 | 6/1988 | Japan |
| 162050 | 6/1988 | Japan |
| 1-123836 | 5/1989 | Japan |
| 1-129038 | 5/1989 | Japan |
| 1563591 | 3/1980 | United Kingdom |

*Primary Examiner*—George F. Lesmes
*Assistant Examiner*—Christopher Brown
*Attorney, Agent, or Firm*—Robert A. Geralch

[57] ABSTRACT

Disclosed is a shaped article comprising a continuous oriented thermoplastic polymer matrix having dispersed therein microbeads of a polymer which are at least partially bordered by void space, the microbeads being present in an amount of about 5–50% weight based on the weight of said oriented thermoplastic, said void space occupying about 2–60% by volume of said shaped article. Preferably, the microbeads are crosslinked to an extent they will be resilient and elastic at the orientation temperature, and are coated with a slip agent. The shaped article is preferably in the form of a sheet, fibers, or other molded article, and preferably has a relatively low specific gravity and whiteness.

39 Claims, 3 Drawing Sheets

U.S. PATENT DOCUMENTS

| | | | |
|---|---|---|---|
| 4,578,297 | 3/1986 | Duncan | 428/35 |
| 4,698,372 | 10/1987 | Moss | 521/145 |
| 4,701,369 | 10/1987 | Duncan | 428/313.9 |
| 4,702,954 | 10/1987 | Duncan | 428/213 |
| 4,704,323 | 11/1987 | Duncan et al. | 428/286 |
| 4,758,462 | 7/1988 | Park et al. | 428/213 |
| 4,761,327 | 8/1988 | Hamano et al. | 428/220 |
| 4,770,931 | 9/1988 | Pollock et al. | 428/304.4 |
| 4,770,931 | 9/1988 | Pollock et al. | 428/304.4 |
| 4,780,402 | 10/1988 | Remmington | 430/533 |
| 4,801,640 | 1/1989 | Dallmann et al. | 524/394 |
| 4,871,784 | 10/1989 | Otonari et al. | 521/138 |
| 4,952,449 | 8/1990 | Okazaki et al. | 428/147 |
| 5,141,685 | 8/1992 | Maier et al. | 264/45.3 |
| 5,143,765 | 9/1992 | Maier et al. | 428/36.5 |

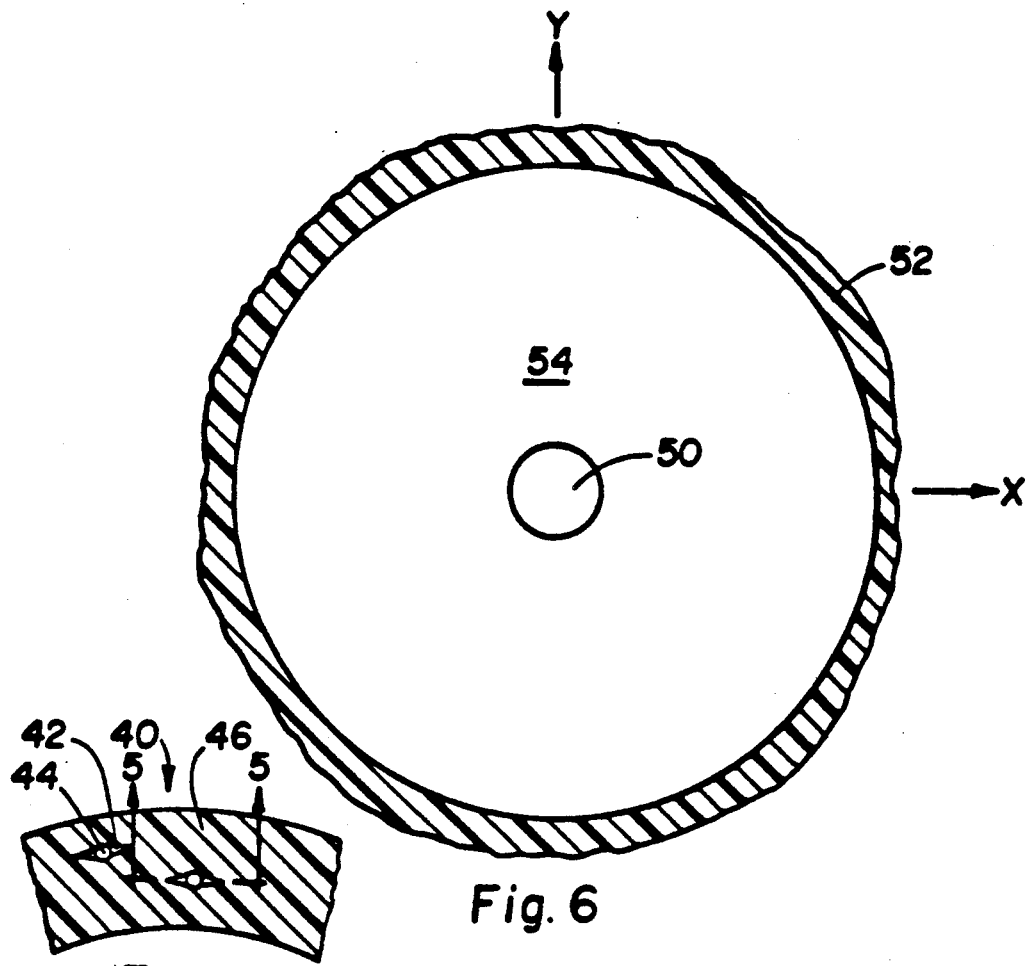
Fig. 4
Fig. 6
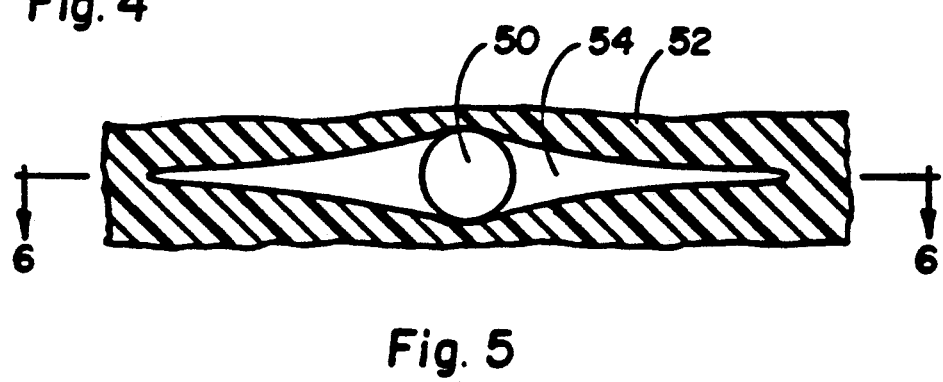
Fig. 5
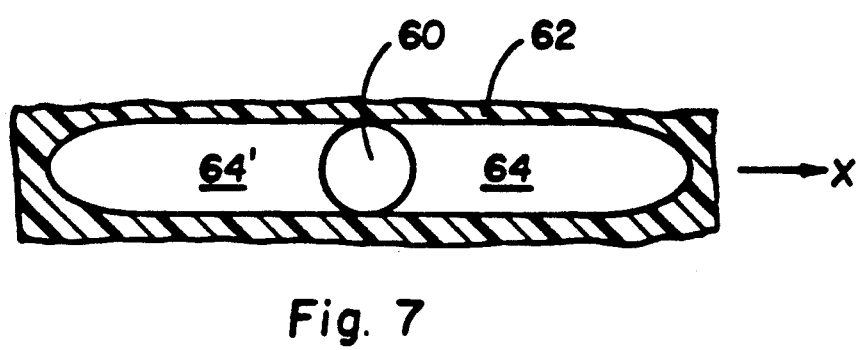
Fig. 7

SHAPED ARTICLES FROM ORIENTABLE POLYMERS AND POLYMER MICROBEADS

This is a continuation of U.S. patent application Ser. No. 673,227, filed Mar. 21, 1991, now U.S. Pat. No. 5,143,765, which is a continuation-in-part application of U.S. patent application Ser. No. 07/625,383, filed Dec. 11, 1990, now U.S. Pat. No. 5,141,685, which is a divisional application of U.S. patent application Ser. No. 07/457,894, filed Dec. 27, 1989, now U.S. Pat. No. 4,994,312.

TECHNICAL FIELD

The present invention is directed to shaped articles such as films, sheets, bottles, tubes, fibers and rods having an oriented polymer continuous phase and polymer microbeads dispersed therein which are at least partially bordered by voids. The articles have unique properties of texture, opaqueness, whiteness in the absence of colorants, and generally good physical properties such as thermal stability, durability, and low density.

BACKGROUND OF THE INVENTION

Blends of linear polyesters with other incompatible materials of organic or inorganic nature to form microvoided structures are well-known in the art. U.S. Pat. No. 3,154,461 discloses, for example, linear polyesters blended with, for example, calcium carbonate. U.S. Pat. No. 3,944,699 discloses blends of linear polyesters with 3 to 27% of organic material such as ethylene or propylene polymer. U.S. Pat. No. 3,640,944 also discloses the use of poly(ethylene terephthalate) blended with 8% organic material such as polysulfone or poly(4-methyl-1-pentene). U.S. Pat. No. 4,377,616 discloses a blend of polypropylene to serve as the matrix with a small percentage of another incompatible organic material, nylon, to initiate microvoiding in the polypropylene matrix. U.K. Patent Specification 1,563,591 discloses linear polyester polymers for making opaque thermoplastic film support in which has been blended finely divided particles of barium sulfate together with a void-promoting polyolefin, such as polyethylene, polypropylene or poly-4-methyl-1-pentene.

The above-mentioned patents show that it is known to use incompatible blends to form films having paper-like characteristics after such blends have been extruded into films and the films have been quenched, biaxially oriented and heat set. The minor component of the blend, due to its incompatibility with the major component of the blend, upon melt extrusion into film forms generally spherical particles each of which initiates a microvoid in the resulting matrix formed by the major component. The melting points of the void initiating particles, in the use of organic materials, should be above the glass transition temperature of the major component of the blend and particularly at the temperature of biaxial orientation.

As indicated in U.S. Pat. No. 4,377,616, spherical particles initiate voids of unusual regularity and orientation in a stratified relationship throughout the matrix material after biaxial orientation of the extruded film. Each void tends to be of like shape, not necessarily of like size since the size depends upon the size of the particle.

Ideally, each void assumes a shape defined by two opposed and edge contacting concave disks. In other words, the voids tend to have a lens-like or biconvex shape. The voids are oriented so that the two major dimensions are aligned in correspondence with the direction of orientation of the film structure. One major dimension is aligned with machine direction orientation, a second major dimension is aligned with the transverse direction orientation, and a minor dimension approximately corresponds to the cross-section dimension of the void-initiating particle. The voids generally tend to be closed cells, and thus there is virtually no path open from one side of a biaxially oriented film to the other side through which liquid or gas can traverse. The term "void" is used herein to mean devoid of solid matter, although it is likely the "voids" contain a gas.

Upon biaxial orientation of the resulting extruded film, the film becomes white and opaque, the opacity resulting from light being scattered from the walls of the microvoids. The transmission of light through the film becomes lessened with increased number and with increased size of the microvoids relative to the size of a particle within each microvoid.

Also, upon biaxial orientation, a matte finish on the surface of the film results, as discussed in U.S. Pat. No. 3,154,461. The particles adjacent the surfaces of the film tend to be incompressible and thus form projections without rupturing the surface. Such matte finishes enable the film to be written upon with pencil or with inks, crayons, and the like.

U.S. Pat. No. 3,944,699 also indicates that the extrusion, quenching and stretching of the film may be effected by any process which is known in the art for producing oriented film, such as by a flat film process or a bubble or tubular process. The flat film process involves extruding the blend through a slit dye and rapidly quenching the extruded web upon a chilled casting drum so that the polyester component of the film is quenched into the amorphous state. The quenched film is then biaxially oriented by stretching in mutually perpendicular directions at a temperature above the glass transition temperature of the polyester. The film may be stretched in one direction and then in a second direction or may be simultaneously stretched in both directions. After the film has been stretched it is heat set by heating to a temperature sufficient to crystallize the polyester while restraining the film against retraction in both directions of stretching.

Paper is essentially a non-woven sheet of more or less randomly arrayed fibers. The key properties of these structures are opacity, texture, strength, and stability. Natural polymers are generally weaker and less stable. A serious problem, for example, is brightness reversion or fading of papers and fibers.

Although there are many ways to produce opaque media, this invention is concerned with creating opacity by stretching or orienting plastic materials to induce microvoids which scatter light, preferably white and ultraviolet light. A large body of prior art deals with this technique, wherein a plurality of inorganic solid particles are used as the dispersed phase, around which the microvoids form. Some significant problems associated with this approach are: (1) agglomeration and particle size control, (2) abrasive wear of extrusion equipment, guides, and cutters, (3) high specific gravity of these solids, (4) poor void nucleation around the solid particles due to the low thermal contraction of solids relative to liquids and polymer wetting and adhesion to the solid surfaces, (5) cost of these materials on a volume basis, and (6) handling and processing problems in general.

Of particular interest is U.S. Pat. No. 4,770,931 which is directed to articles comprising a continuous polyester phase having dispersed therein microbeads of cellulose acetate which are at least partially bordered by void space. The present invention is unexpected, however, in that while the geometries are similar, the cross-linked beads disclosed herein cavitate more efficiently generating higher void fractions and improved properties per weight of added beads. Also, the compositions of this invention have superior thermal and chemical stability, when compared with the prior art, especially the cellulose esters. Also, of particular interest is U.S. Pat. No. 4,320,207 which discloses oriented polyester film containing pulverized cross-linked polymers.

DESCRIPTION OF THE DRAWINGS

In the drawings:

FIG. 4 is a section of a shaped article in the form of a bottle;

FIG. 5 is an enlarged section view illustrating a cross-linked polymer microbead entrapped in a void in a polyester continuous matrix;

FIG. 6 is a sectional view taken along lines 6—6 of FIG. 5;

FIG. 7 is a sectional view similar to FIG. 5 illustrating a modification of the present invention.

DESCRIPTION OF THE INVENTION

In accordance with the present invention, i shaped articles are provided which have unique properties such as texture, opacity, low density, whiteness, etc. The articles are especially useful when in the form of film or sheet material (e.g., as a paper substitute) or when in the form of a biaxially oriented bottle (beverage container).

An important aspect of this invention is that during melt processing the orientable polymer does not react chemically or physically with the microbead polymer and/or its coating in such a way as to cause one or more of the following to occur to a significant or unacceptable degree: (a) alteration of the crystallization kinetics of the matrix polymer making it difficult to orient, (b) destruction of the matrix polymer, (c) destruction of the microbeads, (d) adhesion of the microbeads to the matrix polymer, or (e) generation of undesirable reaction products, such as toxic or high-color moieties.

Figure 1:
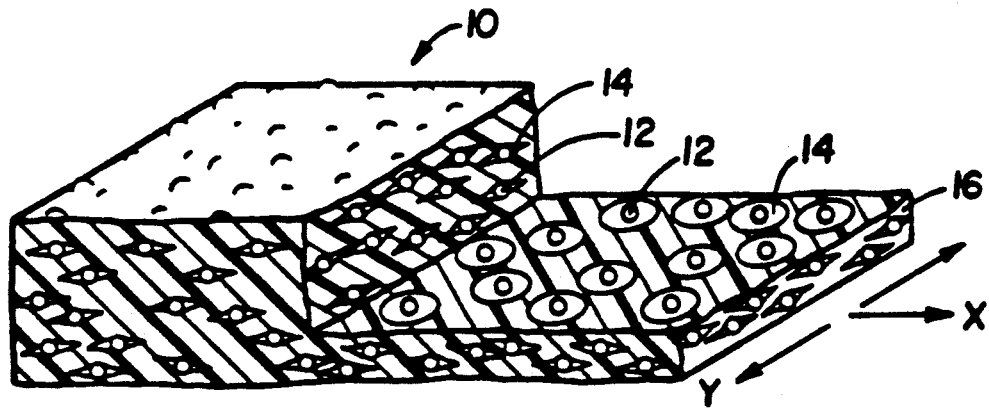
FIG. 1 is a perspective view in section illustrating an embodiment of the present invention.

Referring to the drawings, FIG. 1 illustrates a shaped article in the form of a sheet 10 which has been biaxially oriented [biaxially stretched, i.e., stretched in both the longitudinal (X) and transverse (Y) directions], as indicated by the arrows. The sheet 10 is illustrated in section, showing microbeads of polymer 12 contained within circular voids 14 in the polymer continuous matrix 16. The voids 14 surrounding the microbeads 12 are theoretically doughnut-shaped, but are often of irregular shape. Often, a line drawn perpendicular to and through the article will penetrate several voids and possibly some microbeads.

Figure 2:
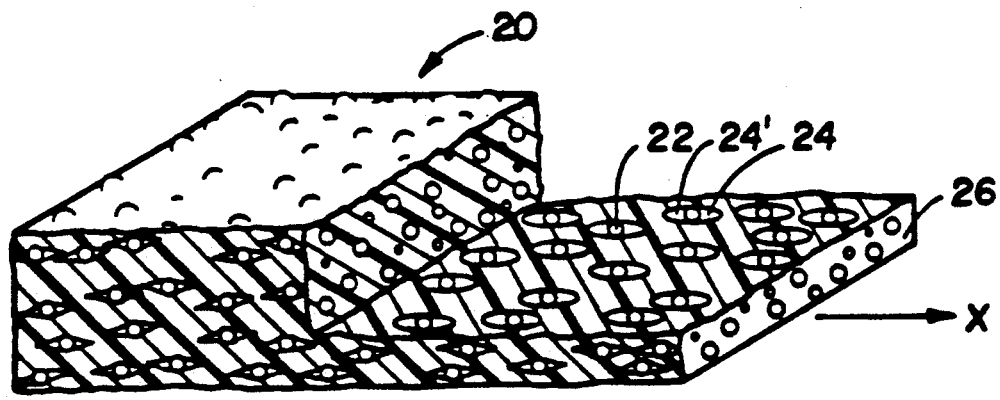
FIG. 2 is a perspective view in section illustrating another embodiment of the present invention.

FIG. 2 also illustrates a shaped article in the form of a sheet 20 which has been unidirectionally oriented (stretched in one direction only, as indicated by the arrow). Microbeads of polymer 22 are contained between microvoids 24 and 24'. The microvoids in this instance form at opposite sides of the microbeads as the sheet is stretched. Thus, if the stretching is done in the machine direction (X) as indicated by the arrow, the voids will form on the leading and trailing sides of the microbeads. This is because of the unidirectional orientation as opposed to the bidirectional orientation of the sheet shown in FIG. 1. This is the only difference between FIGS. 1 and 2. Note particularly the bumpy texture of the surfaces.

Figure 3:
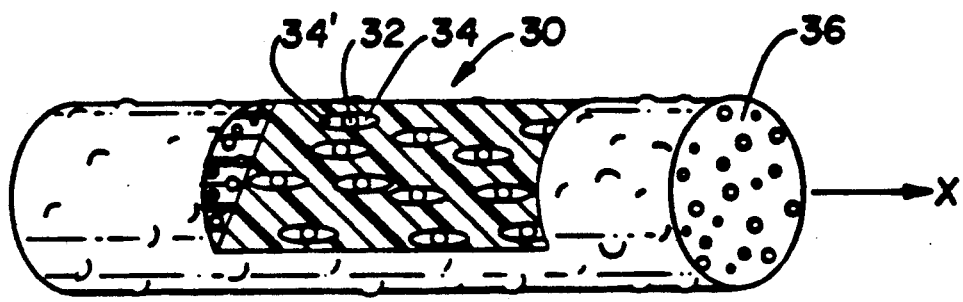
FIG. 3 is a perspective view illustrating still another embodiment of the present invention.

FIG. 3 illustrates a shaped article in the form of a fiber or rod 30 which has been oriented by stretching in the lengthwise (X) direction. The microbeads 32 of cross-linked polymer are bordered by microvoids 34 and 34'.

FIG. 4 illustrates a section of the wall of a shaped article 40 such as a bottle or wire coating. Due to the bidirectional orientation or stretching, the microvoids 42 are generally doughnut-shaped, surrounding the microbeads 44, in a manner similar to that shown in FIG. 1.

FIGS. 5 and 6 are sectional views illustrating enlargement of a section of a shaped article according to this invention, microbead 50 being entrapped within polymer continuous matrix 52 and encircled by void 54. These structures result from the shaped article being stretched in the X and Y directions.

FIG. 7 is a view similar to FIG. 5, except illustrating in enlarged form microbead 60 entrapped in polymer continuous matrix 62, having formed on opposite sides thereof microvoids 64 and 64', which are formed as the shaped article is stretched in the direction of the arrow X.

Figure 8:
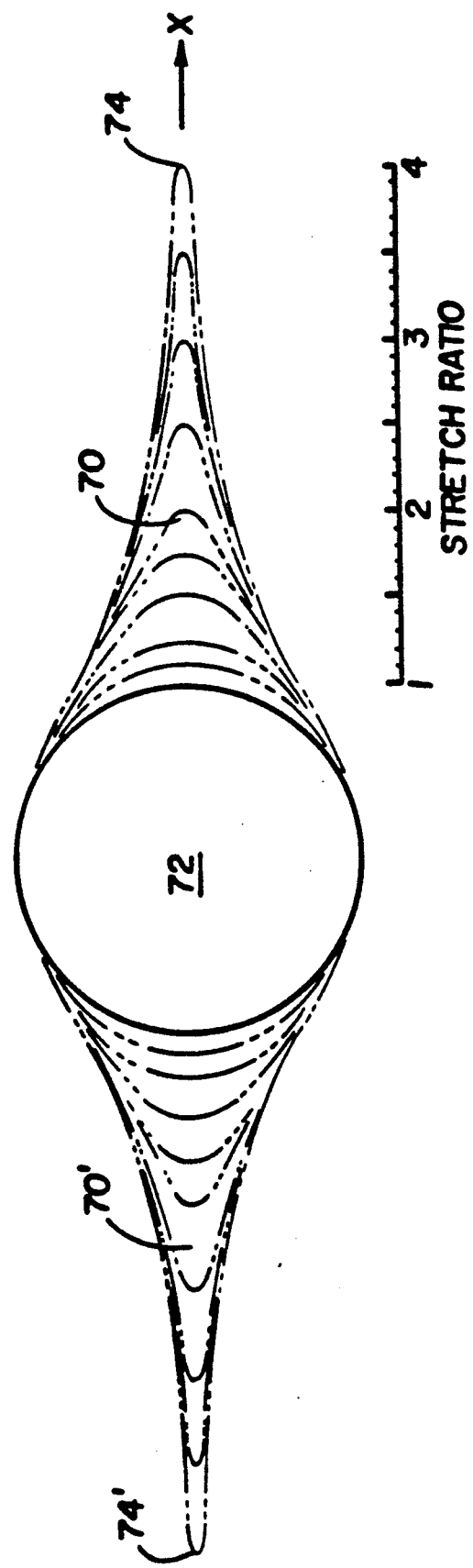
FIG. 8 is a graphical representation illustrating how the size of microvoids surrounding microbeads changes with respect to stretch ratio.

FIG. 8 is an enlargement illustrating the manner in which microvoids are formed in the polymer continuous matrix as the shaped article is stretched or oriented. The formation of the microvoids 70 and 70' around microbeads 72 is illustrated on a stretch ratio scale as the shaped article is stretched up to 4 times its original dimension. For example, as the article is stretched 4 times its original dimension in the X direction (4X), the voids 70 and 70' would extend to the points 74 and 74' respectively.

There are two aspects of the present invention. First, the microbeads are preferably cross-linked to give them resiliency and elasticity. Second, the microbeads are coated with a "slip agent" to permit easier sliding with respect to the matrix polymer to thereby result in more microvoiding. Although both aspects are believed to be unique and result in improved results to an extent, it is preferred that the microbeads be both cross-linked and coated with a slip agent. Thus, the microbeads will be often described herein as being both cross-linked and coated with a slip agent.

The present invention provides shaped articles comprising a continuous thermoplastic polymer phase having dispersed therein microbeads of polymer which are at least partially bordered by voids, the microbeads of polymer having a size of about 0.1-50 microns, preferably about 2-20 microns, and being present in an amount of about 5-50% by weight based on the weight of continuous phase polymer, the voids occupying about 2-60% by volume of the shaped article. The matrix polymer containing the generally spherical polymer microbeads which, according to one aspect of the invention, are cross-linked to the extent of having a resiliency or elasticity at orientation temperatures of the matrix polymer such that a generally spherical shape of the cross-linked polymer is maintained after orientation of the matrix polymer. The composition of the shaped article when consisting only of the polymer continuous phase and microbeads bordered by voids, is characterized by having a specific gravity of less than 1.20, preferably about 0.3–1.0, preferably a Kubelka-Munk R value (infinite thickness) of about 0.90 to about 1.0, and preferably the following Kubelka-Munk values when formed into a 3 mil thick film:

| Opacity | about 0.78 to about 1.0 |
| SX | 25 or less |
| KX | about 0.001 to 0.2 |
| Ti | about 0.02 to 1.0 | wherein the opacity values indicate that the article is opaque, the SX values indicate a large amount of light scattering through the thickness of the article, the KX values indicate a low amount of light absorption through the thickness of the article, and the Ti values indicate a low level amount of internal transmittance of the thickness of the article. The R (infinite thickness) values indicate a large amount of light reflectance.

Obviously, the Kubelka-Munk values which are dependent on thickness of the article must be specified at a certain thickness. Although the shaped articles themselves may be very thin, e.g., less than 1 mil or they may be thicker, e.g., 20 mils, the Kubelka-Munk values, except for R infinity, are specified at 3 mils and in the absence of any additives which would effect optical properties. Thus, to determine whether shaped articles have the optical properties called for, the polyester containing microbeads at least partially bordered by voids, without additives, should be formed in a 3 mils thick film for determination of Kubelka-Munk values.

The shaped articles according to this invention are useful, for example, when in the forms of sheets or films, bottles, ribbons, fibers or rods, wire coatings, etc. In the absence of additives or colorants, they are very white, have a very pleasant feel or hand and are receptive to ink, especially the polyester matrices, from writing instruments, especially conventional ball point pens. In fact, one of the most important uses contemplated for the present invention is as a synthetic paper for writing on or for prints such as drawings and other graphic, photographic and printing applications. The shaped articles are very resistant to wear, moisture, oil, tearing, etc.

The shaped article is preferably in the form of a paper-like sheet having a thickness of about 0.10–20 mils in thickness. The shaped article may also be an oriented bottle made by injection blow molding, or may be in the form of a fiber or rod. Preferably, the article is made by biaxial orientation using procedures well known in the art.

The products made in accordance with this invention are very durable. For example, when made into biaxially oriented films, the resultant synthetic papers are strong, ultra-white, highly-opaque, and long-lasting. Such papers are suitable for "archival" records and will retain their properties for very long periods of time, even when compared to the so-called "archival quality" papers of today. Not only are the synthetic papers of this invention extremely white, they are virtually free of the problem which plagues cellulose-based papers, i.e., "brightness reversion" or Yellowing with time.

The products of this invention are environmentally desirable products. They are long lasting, durable, and recyclable. They can be made from "recycled" materials; e.g., poly(ethylene terephthalate) beverage bottles. Also, upon incineration, less than 1% ash and no undesirables such as chlorine, cyanides, etc. are found. Finally, if they are put into landfills, they will not make toxic gases or liquids, and they will not threaten the quality of our air or ground water.

The continuous phase polymer may be any thermoplastic polymer capable of being cast into a film or sheet and then oriented, spun into fibers, extruded into rods or extrusion, blow-molded into containers such as bottles, etc. Suitable classes of thermoplastic polymers include polyesters, polyolefins, polyamides, polycarbonates, cellulosic esters, polystyrene, polyvinyl resins, polysulfonamides, polyethers, polyimides, polyvinylidene flouride, polyurethanes, polyphenylenesulfides, polytetrafluoroethylene, polyacetals, and polysulfonates. Copolymers and/or mixtures of these polymers can also be used.

Suitable polyesters include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic and mixtures thereof. Examples of suitable glycols include ethylene glycol, propylene glycol, butanediol, pentanediol, hexanediol, 1,4-cyclohexanedimethanol, diethylene glycol, other polyethylene glycols and mixtures thereof. Such polyesters are well known in the art and may be produced by well-known techniques, e.g., those described in U.S. Pat. Nos. 2,465,319 and 2,901,466. Preferred continuous matrix polyesters are those having repeat units from terephthalic acid or naphthalene dicarboxylic acid and at least one glycol selected from ethylene glycol, 1,4-butanediol and 1,4-cyclohexanedimethanol. Poly(ethylene terephthalate), which may be modified by small amounts of other monomers, is especially preferred. Other suitable polyesters include liquid crystal copolyesters formed by the inclusion of a suitable amount of a co-acid component such as stilbene dicarboxylic acid. Examples of such liquid crystal copolyesters are those disclosed in U.S. Pat. Nos. 4,420,607, 4,459,402 and 4,468,510.

Suitable polyolefins include polyethylene, polypropylene, polymethylpentene, and mixtures thereof. Polyolefin copolymers, including copolymers of ethylene and propylene are also useful.

Useful polyamides are nylon 6, nylon 66, and mixtures thereof. Copolymers of polyamides are also suitable continuous phase polymers.

An example of a useful polycarbonates is bisphenol A polycarbonate.

Cellulosic esters suitable for use as the continuous phase polymer are cellulose nitrate, cellulose triacetate, cellulose diacetate, cellulose acetate propionate, cellulose acetate butyrate, and mixtures or copolymers thereof.

Useful polyvinyl resins include polyvinyl chloride, poly(vinyl acetal), and mixtures thereof. Copolymers of vinyl resins can also be utilized.

Suitable cross-linked polymers for the microbeads are polymerizable organic materials which are members selected from the group consisting of an alkenyl aromatic compound having the general formula

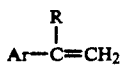

wherein Ar represents an aromatic hydrocarbon radical, or an aromatic halohydrocarbon radical of the benzene series and R is hydrogen or the methyl radical; acrylate-type monomers include monomers of the formula

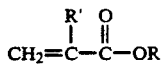

wherein R is selected from the group consisting of hydrogen and an alkyl radical containing from about 1 to 12 carbon atoms and R' is selected from the group consisting of hydrogen and methyl; copolymers of vinyl chloride and vinylidene chloride, acrylonitrile and vinyl chloride, vinyl bromide, vinyl esters having the formula

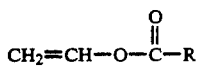

wherein R is an alkyl radical containing from 2 to 18 carbon atoms; acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series $HO(CH_2)_nOH$ wherein n is a whole number within the range of 2-10 and having reactive olefinic linkages within the polymer molecule, the hereinabove described polyesters which include copolymerized therein up to 20 percent by weight of a second acid or ester thereof having reactive olefinic unsaturation and mixtures thereof, and a cross-linking agent selected from the group consisting of divinylbenzene, diethylene glycol dimethacrylate, oiallyl fumarate, diallyl phthalate and mixtures thereof.

Examples of typical monomers for making the cross-linked polymer include styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acrylic acid, divinylbenzene, acrylamidomethylpropane sulfonic acid, vinyl toluene, etc. Preferably, the cross-linked polymer is polystyrene or poly(methyl methacrylate). Most preferably, it is polystyrene and the cross-linking agent is divinylbenzene.

Processes well known in the art yield non-uniformly sized particles, characterized by broad particle size distributions. The resulting beads can be classified by screening to produce beads spanning the range of the original distribution of sizes. Other processes such as suspension polymerization, limited coalescence, directly yield very uniformly sized particles.

Suitable slip agents or lubricants include colloidal silica, colloidal alumina, and metal oxides such as tin oxide and aluminum oxide. The preferred slip agents are colloidal silica and alumina, most preferably, silica. The cross-linked polymer having a coating of slip agent may be prepared by procedures well known in the art. For example, conventional suspension polymerization processes wherein the slip agent is added to the suspension is preferred. As the slip agent, colloidal silica is preferred.

It is preferred to use the "limited coalescence" technique for producing the coated, cross-linked polymer microbeads. This process is described in detail in U.S. Pat. No. 3,615,972, incorporated herein by reference. Preparation of the coated microbeads for use in the present invention does not utilize a blowing agent as described in this patent, however.

The following general procedure may be utilized in a limited coalescence technique.

1. The polymerizable liquid is dispersed within an aqueous nonsolvent liquid medium to form a dispersion of droplets having sizes not larger than the size desired for the polymer globules, whereupon
2. The dispersion is allowed to rest and to reside with only mild or no agitation for a time during which a limited coalescence of the dispersed droplets takes place with the formation of a lesser number of larger droplets, such coalescence being limited due to the composition of the suspending medium, the size of the dispersed droplets thereby becoming remarkably uniform and of a desired magnitude, and
3. The uniform droplet dispersion is then stabilized by addition of thickening agents to the aqueous suspending medium, whereby the uniform-sized dispersed droplets are further protected against coalescence and are also retarded from concentrating in the dispersion due to difference in density of the disperse phase and continuous phase, and
4. The polymerizable liquid or oil phase in such stabilized dispersion is subjected to polymerization conditions and polymerized, whereby globules of polymer are obtained having spheroidal shape and remarkably uniform and desired size, which size is predetermined principally by the composition of the initial aqueous liquid suspending medium.

The diameter of the droplets of polymerizable liquid, and hence the diameter of the beads of polymer, can be varied predictably, by deliberate variation of the composition of the aqueous liquid dispersion, within the range of from about one-half of a micron or less to about 0.5 centimeter. For any specific operation, the range of diameters of the droplets of liquid, and hence of polymer beads, has a factor in the order of three or less as contrasted to factors of 10 or more for diameters of droplets and beads prepared by usual suspension polymerization methods employing critical agitation procedures. Since the bead size, e.g., diameter, in the present method is determined principally by the composition of the aqueous dispersion, the mechanical conditions, such as the degree of agitation, the size and design of the apparatus used, and the scale of operation, are not highly critical. Furthermore, by employing the same composition, the operations can be repeated, or the scale of operations can be changed, and substantially the same results can be obtained.

The present method is carried out by dispersing one part by volume of a polymerizable liquid into at least 0.5, preferably from 0.5 to about 10 or more, parts by volume of a nonsolvent aqueous medium comprising water and at least the first of the following ingredients.

1. A water-dispersible, water-insoluble solid colloid, the particles of which, in aqueous dispersion, have dimensions in the order of from about 0.008 to about 50 microns, which particles tend to gather at the liquid-liquid interface or are caused to do so by the presence of 2. A water-soluble "promotor" that affects the "hydrophilic-hydrophobic balance" of the solid colloid particles; and/or
3. An electrolyte; and/or
4. Colloid-active modifiers such as peptizing agents, surface-active agents and the like; and, usually,
5. A water-soluble, monomer-insoluble inhibitor of polymerization.

The water-dispersible, water-insoluble solid colloids can be inorganic materials such as metal salts or hydroxides or clays, or can be organic materials such as raw starches, sulfonated cross-linked organic high polymers, resinous polymers and the like.

The solid colloidal material must be insoluble but dispersible in water and both insoluble and nondispersible in, but wettable by, the polymerizable liquid. The solid colloids must be much more hydrophilic than oleophilic so as to remain dispersed wholly within the aqueous liquid. The solid colloids employed for limited coalescence are ones having particles that, in the aqueous liquid, retain a relatively rigid and discrete shape and size within the limits stated. The particles may be greatly swollen and extensively hydrated, provided that the swollen particle retains a definite shape, in which case the effective size is approximately that of the swollen particle. The particles can be essentially single molecules, as in the case of extremely high molecular weight cross-linked resins, or can be aggregates of many molecules. Materials that disperse in water to form true or colloidal solutions in which the particles have a size below the range stated or in which the particles are so diffuse as to lack a discernible shape and dimension are not suitable as stabilizers for limited coalescence. The amount of solid colloid that is employed is usually such as corresponds to from about 0.01 to about 10 or more grams per 100 cubic centimeters of the polymerizable liquid.

In order to function as a stabilizer for the limited coalescence of the polymerizable liquid droplets, it is essential that the solid colloid must tend to collect with the aqueous liquid at the liquid-liquid interface, i.e., on the surface of the oil droplets. (The term "oil" is occasionally used herein as generic to liquids that are insoluble in water.) In many instances, it is desirable to add a "promoter" material to the aqueous composition to drive the particles of the solid colloid to the liquid-liquid interface. This phenomenon is well known in the emulsion art, and is here applied to solid colloidal particles, as an expanded way of adjusting the "hydrophilic-hydrophobic balance."

Usually, the promoters are organic materials that have an affinity for the solid colloid and also for the oil droplets and that are capable of making the solid colloid more oleophilic. The affinity for the oil surface is usually due to some organic portion of the promoter molecule while affinity for the solid colloid is usually due to opposite electrical charges. For example, positively charged complex metal salts or hydroxides, such as aluminum hydroxide, can be promoted by the presence of negatively charged organic promoters such as water-soluble sulfonated polystyrenes, alginates and carboxymethylcellulose. Negatively charged colloids, such as Bentonite, are promoted by positively charged promoters such as tetramethyl ammonium hydroxide or chloride or water-soluble complex resinous amine condensation products such as the water-soluble condensation products of diethanolamine and adipic acid, the water-soluble condensation products of ethylene oxide, urea and formaldehyde, and polyethylenimine. Amphoteric materials such as proteinaceous materials like gelatin, glue, casein, albumin, glutin and the like, are effective promoters for a wide variety of colloidal solids. Non-ionic materials like methoxycellulose are also effective in some instances. Usually, the promoter need be used only to the extent of a few parts per million of aqueous medium although larger proportions can often be tolerated. In some instances, ionic materials normally classed as emulsifiers, such as soaps, long chain sulfates and sulfonates and the long chain quaternary ammonium compounds, can also be used as promoters for the solid colloids, but care must be taken to avoid causing the formation of stable colloidal emulsions of the polymerizable liquid and the aqueous liquid medium.

An effect similar to that of organic promoters is often obtained with small amounts of electrolytes, e.g., water-soluble, ionizable alkalis, acids and salts, particularly those having polyvalent ions. These are especially useful when the excessive hydrophilic or insufficient oleophilic characteristic of the colloid is attributable to excessive hydration of the colloid structure. For example, a suitably cross-linked sulfonated polymer of styrene is tremendously swollen and hydrated in water. Although the molecular structure contains benzene rings which should confer on the colloid some affinity for the oil phase in the dispersion, the great degree of hydration causes the colloidal particles to be enveloped in a cloud of associated water. The addition of a soluble, ionizable polyvalent cationic compound, such as an aluminum or calcium salt, to the aqueous composition causes extensive shrinking of the swollen colloid with exudation of a part of the associated water and exposure of the organic portion of the colloid particle, thereby making the colloid more oleophilic.

The solid colloidal particles whose hydrophilic-hydrophobic balance is such that the particles tend to gather in the aqueous phase at the oil-water interface, gather on the surface of the oil droplets and function as protective agents in the phenomenon of limited coalescence.

Other agents that can be employed in an already known manner to effect modification of the colloidal properties of the aqueous composition are those materials known in the art as peptizing agents, flocculating and deflocculating agents, sensitizers, surface active agents and the like.

It is sometimes desirable to add to the aqueous liquid a few parts per million of a water-soluble, oil-insoluble inhibitor of polymerization effective to prevent the polymerization of monomer molecules that might diffuse into the aqueous liquid or that might be absorbed by colloid micelles and that, if allowed to polymerize in the aqueous phase, would tend to make emulsion-type polymer dispersions instead of, or in addition to, the desired bead or pearl polymers.

The aqueous medium containing the water-dispersible solid colloid is then admixed with the liquid polymerizable material in such a way as to disperse the liquid polymerizable material as small droplets within the aqueous medium. This dispersion can be accomplished by any usual means, e.g., by mechanical stirrers or shakers, by pumping through jets, by impingement, or by other procedures causing subdivision of the polymerizable material into droplets in a continuous aqueous medium.

The degree of dispersion, e.g., by agitation is not critical except that the size of the dispersed liquid droplets must be no larger, and is preferably much smaller, than the stable droplet size expected and desired in the stable dispersion. When such condition has been attained, the resulting dispersion is allowed to rest with only mild, gentle movement, if any, and preferably without agitation. Under such quiescent conditions, the dispersed liquid phase undergoes a limited degree of coalescence.

"Limited coalescence" is a phenomenon wherein droplets of liquid dispersed in certain aqueous suspending media coalesce, with formation of a lesser number of larger droplets, until the growing droplets reach a certain critical and limiting size, whereupon coalescence substantially ceases. The resulting droplets of dispersed liquid, which can be as large as 0.3 and sometimes 0.5 centimeter in diameter, are quite stable as regards further coalescence and are remarkably uniform in size. If such a large droplet dispersion be vigorously agitated, the droplets are fragmented into smaller droplets. The fragmented droplets, upon quiescent standing, again coalesce to the same limited degree and form the same uniform-sized, large droplet, stable dispersion. Thus, a dispersion resulting from the limited coalescence comprises droplets of substantially uniform diameter that are stable in respect to further coalescence.

The principles underlying this phenomenon have now been adapted to cause the occurrence of limited coalescence in a deliberate and predictable manner in the preparation of dispersions of polymerizable liquids in the form of droplets of uniform and desired size.

In the phenomenon of limited coalescence, the small particles of solid colloid tend to collect with the aqueous liquid at the liquid-liquid interface, i.e., on the surface of the oil droplets. It is thought that droplets which are substantially covered by such solid colloid are stable to coalescence while droplets which are not so covered are not stable. In a given dispersion of a polymerizable liquid the total surface area of the droplets is a function of the total volume of the liquid and the diameter of the droplets. Similarly, the total surface area barely coverable by the solid colloid, e.g., in a layer one particle thick, is a function of the amount of the colloid and the dimensions of the particles thereof. In the dispersion as initially prepared, e.g., by agitation, the total surface area of the polymerizable liquid droplets is greater than can be covered by the solid colloid. Under quiescent conditions, the unstable droplets begin to coalesce. The coalescence results in a decrease in the number of oil droplets and a decrease in the total surface area thereof up to a point at which the amount of colloidal solid is barely sufficient substantially to cover the total surface of the oil droplets, whereupon coalescence substantially ceases.

If the solid colloidal particles do not have nearly identical dimensions, the average effective dimension can be estimated by statistical methods. For example, the average effective diameter of spherical particles can be computed as the square root of the average of the squares of the actual diameters of the particles in a representative sample.

It is usually beneficial to treat the uniform droplet suspension prepared as described above to render the suspension stable against congregation of the oil droplets.

This further stabilization is accomplished by gently admixing with the uniform droplet dispersion an agent capable of greatly increasing the viscosity of the aqueous liquid. For this purpose, there may be used any water-soluble or water-dispersible thickening agent that is insoluble in the oil droplets and that does not remove the layer of solid colloidal particles covering the surface of the oil droplets at the oil-water interface. Examples of suitable thickening agents are sulfonated polystyrene (water-dispersible, thickening grade), hydrophilic clays such as Bentonite, digested starch, natural gums, carboxy-substituted cellulose ethers and the like. Often the thickening agent is selected and employed in such quantities as to form a thixotropic gel in which are suspended the uniform-sized droplets of the oil. In other words, the thickened liquid generally should be non-Newtonian in its fluid behavior, i.e., of such a nature as to prevent rapid movement of the dispersed droplets within the aqueous liquid by the action of gravitational force due to the difference in density of the phases. The stress exerted on the surrounding medium by a suspended droplet is not sufficient to cause rapid movement of the droplet within such non-Newtonian media. Usually, the thickener agents are employed in such proportions relative to the aqueous liquid that the apparent viscosity of the thickened aqueous liquid is in the order of at least 500 centipoises (usually determined by means of a Brookfield viscosimeter using the No. 2 spindle at 30 r.p.m.). The thickening agent is preferably prepared as a separate concentrated aqueous composition that is then carefully blended with the oil droplet dispersion.

The resulting thickened dispersion is capable of being handled, e.g., passed through pipes, and can be subjected to polymerization conditions substantially without mechanical change in the size or shape of the dispersed oil droplets.

The resulting dispersions are particularly well suited for use in continuous polymerization procedures that can be carried out in coils, tubes and elongated vessels adapted for continuously introducing the thickened dispersions into one end and for continuously withdrawing the mass of polymer beads from the other end. The polymerization step is also practiced in batch manner.

The order of the addition of the constituents to the polymerization usually is not critical, but beneficially it is more convenient to add to a vessel the water, dispersing agent, and incorporated oil-soluble catalyst to the monomer mixture, and subsequently add with agitation the monomer phase to the water phase.

The following is an example illustrating a procedure for preparing the cross-linked polymeric microbeads coated with slip agent. In this example, the polymer is polystyrene cross-linked with divinylbenzene. The microbeads have a coating of silica. The microbeads are prepared by a procedure in which monomer droplets containing an initiator are sized and heated to give solid polymer spheres of the same size as the monomer droplets. A water phase is prepared by combining 7 liters of distilled water, 1.5 g potassium dichromate (polymerization inhibitor for the aqueous phase), 250 g polmethylaminoethanol adipate (promoter), and 350 g LUDOX (a colloidal suspension containing 50% silica sold by DuPont). A monomer phase is prepared by combining 3317 g styrene, 1421 g divinylbenzene (55% active crosslinking agent; other 45% is ethyl vinyl benzene which forms part of the styrene polymer chain) and 45 g VAZO 52 (a monomer-soluble initiator sold by Dupont). The mixture is passed through a homogenizer to obtain 5 micron droplets. The suspension is heated overnight at 52° C. to give 4.3 kg of generally spherical microbeads having an average diameter of about 5 microns with narrow size distribution (about 2-10 microns size distribution). The mole proportion of styrene and ethyl vinyl benzene to divinylbenzene is about 6.1%. The concentration of divinylbenzene can be adjusted up or down to result in about 2.5-50% (preferably 10-40%) crosslinking by the active cross-linker. Of course, monomers other than styrene and divinylbenzene can be used in similar suspension polymerization processes known in the art. Also, other initiators and promoters may be used as known in the art. Also, slip agents other than silica may also be used. For example, a number of LUDOX colloidal silicas are available from Dupont. LEPANDIN colloidal alumina is available from Degussa. NALCOAG colloidal silicas are available from Nalco and tin oxide and titanium oxide are also available from Nalco.

Normally, for the polymer to have suitable physical properties such as resiliency, the polymer is crosslinked. In the case of styrene crosslinked with divinylbenzene, the polymer is about 2.5-50% cross-linked, preferably about 20-40% cross-linked. By percent cross-linked, it is meant the mol % of crosslinking agent based on the amount of primary monomer. Such limited crosslinking produces microbeads which are sufficiently coherent to remain intact during orientation of the continuous polymer. Beads of such crosslinking are also resilient, so that when they are deformed (flattened) during orientation by pressure from the matrix polymer on opposite sides of the microbeads, they subsequently resume their normal spherical shape to produce the largest possible voids around the microbeads to thereby produce articles with less density.

The microbeads are referred to herein as having a coating of a "slip agent". By this term it is meant that the friction at the surface of the microbeads is greatly reduced. Actually, it is believed this is caused by the silica acting as miniature ball bearings at the surface. Slip agent may be formed on the surface of the microbeads during their formation by including it in the suspension polymerization mix.

Microbead size is regulated by the ratio of silica to monomer. For example, the following ratios produce the indicated size microbead:

| Microbead Size, Microns | Monomer, Parts by Wt. | Slip Agent (Silica) Parts by Wt. |
| --- | --- | --- |
| 2 | 10.4 | 1 |
| 5 | 27.0 | 1 |
| 20 | 42.4 | 1 |

The microbeads of cross-linked polymer range in size from about 0.1-50 microns, and are present in an amount of about 5-50% by weight based on the weight of the polyester. Microbeads of polystyrene should have a Tg of at least 20° C. higher than the Tg of the continuous matrix polymer and are hard compared to the continuous matrix polymer.

Elasticity and resiliency of the microbeads generally results in increased voiding, and it is preferred to have the Tg of the microbeads as high above that of the matrix polymer as possible to avoid deformation during orientation. It is not believed that there is a practical advantage to cross-linking above the point of resiliency and elasticity of the microbeads.

The microbeads of cross-linked polymer are at least partially bordered by voids. The void space in the shaped article should occupy about 2-60%, preferably about 30-50%, by volume of the shaped article. Depending on the manner in which the shaped articles are made, the voids may completely encircle the microbeads, e.g., a void may be in the shape of a doughnut (or flattened doughnut) encircling a microbead, or the voids may only partially border the microbeads, e.g., a pair of voids may border a microbead on opposite sides.

The invention does not require but permits the use or addition of a plurality of organic and inorganic materials such as fillers, pigments, antiblocks, anti-stats, plasticizers, dyes, stabilizers, nucleating agents, optical brighteners, etc. These materials may be incorporated into the matrix phases, into the dispersed phases, or may exist as separate dispersed phases.

During stretching the voids assume characteristic shapes from the balanced biaxial orientation of paper-like films to the uniaxial orientation of microvoided/satin-like fibers. Balanced microvoids are largely circular in the plane of orientation while fiber microvoids are elongated in the direction of the fiber axis. The size of the microvoids and the ultimate physical properties depend upon the degree and balance of the orientation, temperature and rate of stretching, crystallization kinetics, the size distribution of the microbeads, and the like.

The shaped articles according to this invention are prepared by (a) forming "a mixture of molten continuous matrix polymer and cross-linked polymer wherein the cross-linked polymer is a multiplicity of microbeads uniformly dispersed throughout the matrix polymer, the matrix polymer being as described hereinbefore, the cross-linked polymer microbeads being as described hereinbefore, (b) forming a shaped article from the mixture by extrusion, casting or molding, (c) orienting the article by stretching to form microbeads of cross-linked polymer uniformly distributed throughout the article and voids at least partially bordering the microbeads on sides thereof in the direction, or directions of orientation.

The mixture may be formed by forming a melt of the matrix polymer and mixing therein the cross-linked polymer. The cross-linked polymer may be in the form of solid or semi-solid microbeads. Due to the incompatibility between the matrix polymer and crosslinked polymer, there is no attraction or adhesion between them, and they become uniformly dispersed in the matrix polymer upon mixing.

When the microbeads have become uniformly dispersed in the matrix polymer, a shaped article is formed by processes such as extrusion, casting or molding. Examples of extrusion or casting would be extruding or casting a film or sheet, and an example of molding would be injection or reheat blow-molding a bottle. Such forming methods are well known in the art. If sheets or film material are cast or extruded, it is important that such article be oriented by stretching, at least in one direction. Methods of unilaterally or bilaterally orienting sheet or film material are well known in the art. Basically, such methods comprise stretching the sheet or film at least in the machine or longitudinal direction after it is cast or extruded an amount of about 1.5-10 times its original dimension. Such sheet or film may also be stretched in the transverse or cross-machine direction by apparatus and methods well known in the art, in amounts of generally 1.5-10 (usually 3-4 for polyesters and 6-10 for polypropylene) times the original dimension. Such apparatus and methods are well known in the art and are described in U.S. Pat. No. 3,903,234, incorporated herein by reference.

If the shaped article is in the form of a bottle, orientation is generally biaxial as the bottle is stretched in all directions as it is blow-molded. Such formation of bottles is also well known in the art. See, for example, U.S. Pat. No. 3,849,530, incorporated herein by reference.

The voids, or void spaces, referred to herein surrounding the microbeads are formed as the continuous matrix polymer is stretched at a temperature above the Tg of the matrix polymer. The microbeads of cross-linked polymer are relatively hard compared to the continuous matrix polymer. Also, due to the incompatibility and immiscibility between the microbead and the matrix polymer, the continuous matrix polymer slides over the microbeads as it is stretched, causing voids to be formed at the sides in the direction or directions of stretch, which voids elongate as the matrix polymer continues to be stretched. Thus, the final size and shape of the voids depends on the direction(s) and amount of stretching. If stretching is only in one direction, microvoids will form at the sides of the microbeads in the direction of stretching. If stretching is in two directions (bidirectional stretching), in effect such stretching has vector components extending radially from any given position to result in a doughnut-shaped void surrounding each microbead.

The preferred preform stretching operation simultaneously opens the microvoids and orients the matrix material. The final product properties depend on and can be controlled by stretching time-temperature relationships and on the type and degree of stretch. For maximum opacity and texture, the stretching is done just above the glass transition temperature of the matrix polymer. When stretching is done in the neighborhood of the higher glass transition temperature, both phases may stretch together and opacity decreases. In the former case, the materials are pulled apart, a mechanical anticompatibilization process. Two examples are high-speed melt spinning of fibers and melt blowing of fibers and films to form non-woven/spun-bonded products. In summary, the scope of this invention includes the complete range of forming operations just described.

In general, void formation occurs independent of, and does not require, crystalline orientation of the matrix polymer. Opaque, microvoided films have been made in accordance with the methods of this invention using completely amorphous, non-crystallizing copolyesters as the matrix phase. Crystallizable/orientable (strain hardening) matrix materials are preferred for some properties like tensile strength and barrier. On the other hand, amorphous matrix materials have special utility in other areas like tear resistance and heat sealability. The specific matrix composition can be tailored to meet many product needs. The complete range from crystalline to amorphous matrix polymer is part of the invention.

Other ingredients are often added such as surfactants, emulsifiers, pigments, and the like during the preparation of such microbeads. Due to the nature of these additives, they tend to remain on the surfaces of the microbeads. In other words, they tend to accumulate at the interface between the polymer and the immiscible medium in which the suspension polymerization is carried out. However, due to the nature of such processes, some of these materials can remain within the core of the beads and some in the immiscible medium. For example, processing and formulating may be done to entrap ingredients within the beads. In other cases, the goal may be to concentrate ingredients on the surface of the beads. It is this highly diverse and very controllable set of bead properties that adds to the uniqueness of this invention.

Examples 1-36 which follow describe in considerable detail biaxially oriented films made with polyethylene terephthalate as the matrix polymer. These examples are submitted for a better understanding of the invention.

For the examples involving cross-linked microbeads, the preparation steps are as follows:

(1) The microbeads are prepared by conventional aqueous suspension polymerization to give nearly monodisperse bead diameters from 2 to 20 microns and at levels of cross-linking from 5 mol % to 30 mol %. Almost all of these examples employ coated microbeads, with the coating thickness being about 50-100 nm.

(2) After separation and drying, the microbeads are compounded on conventional twin-screw extrusion equipment into the orientable polymer to a level of 25% by weight and pelletized to form a concentrate, suitable for let-down to lower loadings.

(3) The microbead concentrate pellets are mixed with virgin pellets and dried using standard conditions for polyethylene terephthalate, 170°-180° C. convection with desiccated air for 4-6 hours.

(4) The dried blends are extruded on conventional single-screw extruders at melt temperatures at about 265°-280° C., standard conditions for the polyethylene terephthalate used.

(5) Films are cast through a standard coat hanger slit die onto a chill roll controlled to a temperature about 50°-60° C. Yielding films ranging from 20 to 60 mils (508-1524 microns) thick.

(6) The films are stretched biaxially and simultaneously using a standard laboratory film stretching unit. Unless otherwise specified all samples are stretched at 105° C.

Examples involving cellulose acetate microbeads are included for comparative purposes. The preparation procedure is as follows:

(1) The polyethylene terephthalate pellets are ground through a 2 mm screen and dry-blended with the cellulose acetate powder.

(2) The blends are pan dried in a vacuum oven with dry nitrogen bleed at about 125°-150° C. for 16 hours.

(3) The dried blends are simultaneously extruded and compounded on conventional single-screw extruders using a standard Maddock mixing section in the metering region of the screw. Melt temperatures are kept as low as possible, about 260°-270° C., to minimize thermal degradation of the cellulose acetate.

(4) During the extrusion, molten CA microbeads form "in situ" by a process of shear emulsification and remain uniformly dispersed due to their high immiscibility with the PET. A distribution of particle diameters is produced ranging from about 0.1-10 microns, with the average being about 1-2 microns.

(5) Films are cast through a standard coat hanger slit die onto a chill roll controlled to a temperature about 50°-60° C. yielding films ranging from 20 to 30 mils (508-761 microns) thick.

(6) The films are stretched biaxially and simultaneously using a standard laboratory film stretching unit. These films were stretched at 100°, 105°, and 110° C.

The materials used in the examples are identified as follows:

PET—polyester having repeat units from terephthalic acid and ethylene glycol; I.V.=0.70

CA—cellulose acetate, viscosity=3.0 seconds, 11.4 poises; acetyl content 39.8%; hydroxyl content=3.5%; melting range=230°-250° C.; Tg=180° C.; number average molecular weight=30,000 (Gel Permeation Chromatography)

PS—polystyrene cross-linked with divinylbenzene to various levels

PMMA—polymethylmethacrylate cross-linked with divinylbenzene to various levels silica—colloidal silica, $SiO_2$, mean particle diameter=20-40 nm alumina—colloidal alumina, $Al_2O_3$, mean particle diameter=20-40 nm cl EXAMPLES 1-36

The examples illustrating this invention are organized into five groups, and the key information is summarized in a pair of tables for each group. Examples 1 through 14 contain silica-coated, crosslinked PS microbeads (Tables 1 & 2). Here variations of microbead loading, level of cross-linking, and bead diameter are described along with the effect of stretch ratio (Examples 7-10). Example 1 is included to illustrate the invention when the coating has been intentionally removed from the microbeads. The higher the cross-linking level, the more resilient or elastic the microbeads, and the efficiency of the cavitation process is increased.

Examples 15 through 18 contain silica-coated, cross-linked PMMA microbeads (Tables 3 & 4). These samples illustrate the invention with the same silica coating on microbeads of a different cross-linked polymer. The next two sets of samples repeat the demonstration with a different coating material. Examples 19 through 22 contain alumina-coated, cross-linked PS microbeads (Tables 5 & 6); and Examples 23 through 26 contain alumina-coated, cross-linked PMMA microbeads (Tables 7 & 8).

Finally, Examples 27 through 36 (Tables 9 & 10) compare, at equal volume % loading, the performance of the silica-coated, 30% cross-linked, 5 micron PS microbeads of this invention to the performance of in situ-generated, high Tg CA microbeads. These comparisons clearly demonstrate a 20% increase in cavitating efficiency for this specific embodiment of the invention relative to the cited prior art.

TABLE 1

Biaxially Oriented Polyester (PET) Films Containing Silica-Coated, Cross-Linked Polystyrene (PS) Microbeads

| Example Number | Mass Ratio PET/PS | Cross-Link Mole % | Bead Diam. Microns | Stretch Ratio | Specific Gravity |
|---|---|---|---|---|---|
| 1 | 75/25 | 30 | 10 | 3.0 | 0.55 |
| 2 | " | 5 | 10 | 3.0 | 0.73 |
| 3 | 80/20 | 30 | 20 | 3.0 | 0.63 |
| 4 | " | 5 | 20 | 3.0 | 0.72 |
| 5 | 80/20 | 30 | 10 | 3.0 | 0.81 |
| 6 | " | 5 | 10 | 3.0 | 0.85 |
| 7 | 80/20 | 30 | 5 | 3.8 | 0.67 |
| 8 | " | 30 | 5 | 3.5 | 0.72 |
| 9 | " | 30 | 5 | 3.0 | 0.81 |
| 10 | " | 30 | 5 | 2.5 | 0.97 |
| 11 NC | " | 30 | 5 | 3.0 | 0.92 |
| 12 | " | 5 | 5 | 3.0 | 1.06 |
| 13 | " | 30 | 2 | 3.0 | 1.00 |
| 14 | " | 5 | 2 | 3.0 | 1.03 |

Note: "NC" indicated "no coating" on the microbeads.

TABLE 2

Kubelka-Munk Analysis (@ 560 nm) of Biaxially Oriented Polyester (PET) Films Containing Silica-Coated, Cross-Linked Polystyrene (PS) Microbeads

| Example Number | Film Thickness Microns | Reflectance R(inf) | Scattering Coef. SX | Absorptance KX | Transmittance T(i) | Opacity |
|---|---|---|---|---|---|---|
| 1 | 297 | 91.1 | 6.38 | 0.028 | 12.5 | 0.931 |
| 2 | 203 | 91.6 | 5.83 | 0.023 | 13.8 | 0.917 |
| 3 | 295 | 92.3 | 3.59 | 0.012 | 20.4 | 0.849 |
| 4 | 229 | 93.3 | 4.99 | 0.012 | 16.2 | 0.885 |
| 5 | 203 | 91.1 | 3.58 | 0.015 | 21.2 | 0.848 |
| 6 | 224 | 91.0 | 5.75 | 0.026 | 13.8 | 0.920 |
| 7 | 127 | 95.2 | 5.20 | 0.006 | 15.9 | 0.876 |
| 8 | 137 | 95.0 | 5.05 | 0.006 | 16.4 | 0.873 |
| 9 | 183 | 93.0 | 6.36 | 0.016 | 13.1 | 0.917 |
| 10 | 206 | 90.6 | 4.67 | 0.023 | 16.8 | 0.894 |
| 11 NC | 150 | 97.1 | 3.21 | 0.001 | 23.7 | 0.785 |
| 12 | 132 | 97.0 | 1.00 | 0.001 | 50.0 | 0.515 |
| 13 | 155 | 93.8 | 6.80 | 0.014 | 12.3 | 0.920 |
| 14 | 137 | 92.5 | 4.04 | 0.012 | 19.3 | 0.859 |

Note: "NC" indicates "no coating" on the microbeads.

TABLE 3

Biaxially Oriented Polyester (PET) Films Containing Silica-Coated, Cross-Linked Polymethylmethacrylate (PMMA) Microbeads

| Example Number | Mass Ratio PET/PMMA | Cross-Link Mole % | Bead Diam. Microns | Stretch Ratio | Specific Gravity |
|---|---|---|---|---|---|
| 15 | 80/20 | 30 | 5 | 3.0 | 0.90 |
| 16 | " | 5 | 5 | 3.0 | 1.06 |
| 17 | 80/20 | 30 | 2 | 3.0 | 1.09 |
| 18 | " | 5 | 2 | 3.0 | 1.23 |

TABLE 4

Kubelka-Munk Analysis (@ 560 nm) of Biaxially Oriented Polyester (PET) Films Containing Silica-Coated, Cross-Linked Polymethylmethacrylate (PMMA) Microbeads

| Example Number | Film Thickness Microns | Reflectance R(inf) | Scattering Coef. SX | Absorptance KX | Transmittance T(i) | Opacity |
|---|---|---|---|---|---|---|
| 15 | 163 | 94.9 | 2.88 | 0.004 | 25.6 | 0.780 |
| 16 | 142 | 96.8 | 2.23 | 0.001 | 30.9 | 0.712 |
| 17 | 117 | 92.9 | 3.68 | 0.010 | 20.9 | 0.840 |
| 18 | 122 | 92.6 | 1.66 | 0.005 | 37.4 | 0.671 |

TABLE 5

Biaxially Oriented Polyester (PET) Films Containing Alumina-Coated, Cross-Linked Polystyrene (PS) Microbeads

| Example Number | Mass Ratio PET/PMMA | Cross-Link Mole % | Bead Diam. Microns | Stretch Ratio | Specific Gravity |
|---|---|---|---|---|---|
| 19 | 80/20 | 30 | 5 | 3.0 | 0.77 |
| 20 | " | 5 | 5 | 3.0 | 0.89 |
| 21 | 80/20 | 30 | 2 | 3.0 | 0.96 |

TABLE 5-continued

Biaxially Oriented Polyester (PET) Films
Containing Alumina-Coated, Cross-Linked
Polystyrene (PS) Microbeads

| Example Number | Mass Ratio PET/PMMA | Cross-Link Mole % | Bead Diam. Microns | Stretch Ratio | Specific Gravity |
|---|---|---|---|---|---|
| 22 | " | 5 | 2 | 3.0 | 0.96 |

TABLE 6

Kubelka-Munk Analysis (@ 560 nm) of
Biaxially Oriented Polyester (PET) Films
Containing Alumina-Coated, Cross-Linked
Polystyrene (PS) Microbeads

| Example Number | Film Thickness Microns | Reflectance R(inf) | Scattering Coef. SX | Absorptance KX | Transmittance T(i) | Opacity |
|---|---|---|---|---|---|---|
| 19 | 185 | 86.0 | 4.74 | 0.054 | 15.4 | 0.925 |
| 20 | 150 | 86.5 | 4.55 | 0.048 | 16.2 | 0.916 |
| 21 | 155 | 91.6 | 6.30 | 0.024 | 12.8 | 0.926 |
| 22 | 152 | 94.0 | 5.05 | 0.010 | 16.2 | 0.882 |

TABLE 7

Biaxially Oriented Polyester (PET) Films
Containing Alumina-Coated, Cross-Linked
Polymethylmethacrylate (PMMA) Microbeads

| Example Number | Mass Ratio PET/PMMA | Cross-Link Mole % | Bead Diam. Microns | Stretch Ratio | Specific Gravity |
|---|---|---|---|---|---|
| 23 | 80/20 | 30 | 5 | 3.0 | 0.90 |
| 24 | " | 5 | 5 | 3.0 | 1.08 |
| 25 | 80/20 | 30 | 2 | 3.0 | 0.88 |
| 26 | " | 5 | 2 | 3.0 | 1.11 |

TABLE 8

Kubelka-Munk analysis (@ 560 nm) of
Biaxially Oriented Polyester (PET) Films
Containing Alumina-Coated, Cross-Linked
Polymethylmethacrylate (PMMA) Microbeads

| Example Number | Film Thickness Microns | Reflectance R(inf) | Scattering Coef. SX | Absorptance KX | Transmittance T(i) | Opacity |
|---|---|---|---|---|---|---|
| 23 | 168 | 89.1 | 3.28 | 0.022 | 22.4 | 0.847 |
| 24 | 135 | 90.8 | 1.80 | 0.008 | 35.3 | 0.703 |
| 25 | 130 | 89.8 | 4.76 | 0.028 | 16.3 | 0.903 |
| 26 | 160 | 76.8 | 1.60 | 0.056 | 35.8 | 0.766 |

TABLE 9

Biaxially Oriented Polyester (PET) Films
Containing Silica-Coated, 30% Cross-Linked
Polystyrene (PS), 5 Micron Microbeads Versus Those
Containing Cellulose Acetate (CA) Microbeads

| Example Number | Bead* Wt. % | Bead Type | Stretch Temp. °C. | Stretch Ratio | Specific Gravity |
|---|---|---|---|---|---|
| 27 | 20 | CA | 100 | 3.5 | 0.90 |
| 28 | 16 | PS | 100 | 3.5 | 0.80 |
| 29 | 20 | CA | 100 | 3.0 | 1.02 |
| 30 | 16 | PS | 100 | 3.0 | 0.88 |
| 31 | 20 | CA | 105 | 3.0 | 0.92 |
| 32 | 16 | PS | 105 | 3.0 | 1.04 |
| 33 | 20 | CA | 110 | 3.0 | 0.96 |
| 34 | 16 | PS | 110 | 3.0 | 1.12 |
| 35 | 20 | CA | 110 | 3.5 | 0.92 |
| 36 | 16 | PS | 110 | 3.5 | 0.94 |

Note: Volume % of the microbeads is equal since the specific gravities of PS and CA are 1.05 and 1.32 respectively.

TABLE 10

Kubelka-Munk Analysis (@ 560 nm) of
Biaxially Oriented Polyester (PET) Films
Containing Silica-Coated, 30% Cross-Linked
Polystyrene (PS), 5 Micron Microbeads Versus Those
Containing Cellulose Acetate (CA) Microbeads

| Example Number | Film Thickness Microns | Reflectance R(inf) | Scattering Coef. SX | Absorptance KX | Transmittance T(i) | Opacity |
|---|---|---|---|---|---|---|
| 27 | 71 | 96.8 | 7.73 | 0.004 | 11.3 | 0.912 |
| 28 | 79 | 97.4 | 6.72 | 0.002 | 12.9 | 0.892 |
| 29 | 88 | 96.5 | 6.80 | 0.004 | 12.7 | 0.900 |
| 30 | 96 | 96.7 | 6.31 | 0.004 | 13.6 | 0.890 |
| 31 | 94 | 97.8 | 5.71 | 0.001 | 14.9 | 0.869 |
| 32 | 84 | 97.5 | 5.94 | 0.002 | 14.3 | 0.877 |
| 33 | 89 | 98.6 | 5.06 | 0.001 | 16.5 | 0.846 |
| 34 | 76 | 97.2 | 5.00 | 0.002 | 16.6 | 0.856 |
| 35 | 69 | 98.1 | 5.64 | 0.001 | 15.0 | 0.865 |
| 36 | 74 | 97.4 | 5.54 | 0.002 | 15.2 | 0.869 |

EXAMPLE 37

Sheet material comprising a polypropylene matrix having microbeads of cross-linked polystyrene-is prepared by mixing the microbeads in molten polypropylene and extruding a sheet. The sheet is oriented by stretching at 140° C. in both directions. The microbeads are 5 microns in diameter and account for 15% by weight of the polypropylene. The cross-linked with divinylbenzene and are cross-linked with divinylbenzene and are cross-linked to different degrees, indicated with specific gravity as follows:

| % Cross-Linked | Specific Gravity |
|---|---|
| 25 | 0.36 |
| 20 | 0.43 |
| 15 | 0.41 |
| 10 | 0.48 |

A very white sheet having good hand is obtained.

The following examples illustrate the invention with respect to two important orientable polyesters. Due to the higher orientation temperatures involved with these matrix polyesters, microbeads with the higher level of cross-linking (about 40 mol %, i.e., 60 mol % polystyrene and 40 mol % divinylbenzene) are used.

EXAMPLE 38

A blend is prepared comprising 85 parts by weight poly(1,4/cyclohexylenedimethylene terephthalate) and 15 parts cross-linked polystyrene. The polyester (I.V.=0.61) is ground through a 2 mm screen, dry blended with the microbeads, vacuum-oven dried, and compounded at 290° C. on a laboratory-sized co-rotating, twin-screw extruder. The pellets are then dried and extruded on a single-screw extruder to make 5.5 inch wide film 20 mils thick. The films were then biaxially oriented (3×3) at 115° C. The resulting films showed the high degree of whiteness and opacity as well as desirable low density discussed in greater detail in the earlier examples.

EXAMPLE 39

In the same manner as the previous example, a blend is prepared comprising 85 parts by weight poly(ethylene naphthalate) and 15 parts cross-linked polystyrene. The polyester (I.V.=0.71) is ground through a 2 mm screen, dry blended with the microbeads, vacuum-oven dried, and compounded at 290° C. on a co-rotating, twin-screw extruder. The pellets are then dried and extruded on a single-screw extruder to make 5.5 inch wide film 20 mils thick. The films are then biaxially oriented (3×3) at 145° C. The resulting films showed the high degree of whiteness and opacity as well as desirable low density discussed in greater detail in the earlier examples.

Where ratios or parts are given, e.g., 80/20, they are parts by weight, with the polyester weight specified first.

The following applies to Kubelka-Munk values:

SX is the scattering coefficient of the whole thickness of the article and is determined as follows:

$$SX = \frac{1}{b} \text{Ar ctgh} \frac{a - R}{b} - \text{Ar ctgh} \frac{a - Rg}{b}$$

wherein:
$b = (a^2 - 1)^{\frac{1}{2}}$
Ar ctgh is the inverse hyperbolic cotangent $$a = 1/2 R + \frac{Ro - R + Rg}{RoRg}$$

Ro is reflectance with black tile behind sheet
R is reflectance with white tile behind sheet
Rg is reflectance of a white tile = 0.89
KX is the absorption coefficient of the whole thickness of the article and is determined as follows:

$$KX = SX(a - 1)$$

wherein
SX and a are as defined above.

R (infinity) is the reflectance of an article if the article was so thick that additional thickness would not change it and is determined as follows:

$$R(\text{infinity}) = a - (a^2 - 1)^{\frac{1}{2}}$$

wherein
a is as defined above.

Ti is the internal light transmittance and is determined as follows:

$$Ti = [(a - Ro)^2 - b^2]^{\frac{1}{2}}$$

$$\text{Opacity} = \frac{Ro}{Rg}$$

wherein
Ro and Rg are as defined above.

In the above formulae, Ro, R and Rg are determined in a conventional manner using a Diano Match-Scan II Spectrophotometer (Milton Roy Co.) using a wavelength of 560 nanometers. Also above, X in the formulae SX and KX is the thickness of the article. A full description of these terms is found in Colors in "Business, Science and Industry" 3rd Edition, by Deane B. Judd & Gunter Wyszecki, published by John Wiley & Sons, N.Y. (1975), pages 397-439, which is incorporated herein by reference.

Glass transition temperatures, Tg and melt temperatures, Tm, are determined using a Perkin-Elmer DSC-2 Differential Scanning Calorimeter.

Unless otherwise specified inherent viscosity is measured in a 60/40 parts by weight solution of phenol/tetrachloroethane 25° C. and at a concentration of about 0.5 gram of polymer in 100 ml of the solvent.

Where acids are specified herein in the formation of the polyesters or copolyesters, it should be understood that ester forming derivatives of the acids may be used rather than the acids themselves as is conventional practice. For example, dimethyl isophthalate may be used rather than isophthalic acid.

Unless otherwise specified, all parts, ratios, percentages, etc. are by weight.

The invention has been described in detail with particular reference to preferred embodiments thereof, but it will be understood that variations and modifications can be effected within the spirit and scope of the invention.

What is claimed:

1. An article shaped as a film, sheet, bottle, tube, fiber, or rod, wherein said article comprises a continuous oriented thermoplastic polymer having dispersed therein microbeads of a cross-linked polymer and which are at least partially bordered by void space formed from substantially closed cells so that substantially no open fluid transport path extends across opposed sides of said article, wherein said microbeads are prepared by a limited coalescence process to produce microbeads having a narrow size distribution, said microbeads being present in an amount of about 5-50% by weight based on the weight of said oriented polymer, said void space occupying about 2-60% by volume of said shaped article.

2. An article according to claim 1, wherein said microbeads are coated with a slip agent.

3. A shaped article according to claim 2 wherein said slip agent is selected from silica and alumina.

4. An article according to claim 1, wherein said cross-linked polymer comprises polymerizable organic material which is a member selected from the group consisting of an alkenyl aromatic compound having the general formula

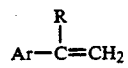

wherein Ar represents an aromatic hydrocarbon radical, or an aromatic halohydrocarbon radical of the benzene series and R is hydrogen or the methyl radical; acrylate-type monomers including monomers of the formula

wherein R is selected from the group consisting of hydrogen and an alkyl radical containing from about 1 to 12 carbon atoms and R' is selected from the group consisting of hydrogen and methyl; copolymers of vinyl chloride and vinylidene chloride, acrylonitrile and vinyl chloride, vinyl bromide, vinyl esters having the formula

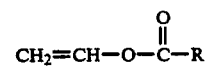

wherein R is an alkyl radical containing from 2 to 18 carbon atoms, acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series $HO(CH_2)_nOH$ wherein n is a whole number within the range of 2-10 and having reactive olefinic linkages within the polymer molecule, the hereinabove described polyesters which include copolymerized therein up to 20 percent by weight of a second acid or ester thereof having reactive olefinic unsaturation and mixtures thereof, and a cross-linking agent selected from the group consisting of divinylbenzene, diethylene glycol dimethacrylate, diallyl fumarate, diallyl phthalate, and mixtures thereof.

5. A shaped article according to claim 1, the composition of which, when consisting only of said continuous phase and said microbeads at least partially bordered by void space, is characterized by having a specific gravity of less than 1.20 and a Kubelka-Munk R value (infinite thickness) of about 0.90 to about 1.0 and the following Kubelka-Munk values when formed into a 3 mil thick film:

| | |
|---|---|
| Opacity | about 0.78 to about 1.0 |
| SX | 25 or less |
| KX | about 0.001 to 0.2 |
| T(i) | about 0.02 to 1.0 |

6. A shaped article according to claim 1, wherein said continuous oriented thermoplastic polymer phase is selected from the group consisting of polyester polyolefins, polyamides, polycarbonates, cellulosic esters, polystyrene, polyvinyl resins, polysulfonamides, polyethers, polyimides, polysulfonates, polyvinylidene fluoride, polyurethanes, polyphenylenesulfides, polytetrafluoroethylene, polyacetals, and copolymers or mixtures thereof or copolymers or mixtures with polyesters.

7. An article according to claim 6, wherein said continuous oriented thermoplastic polymer is a polyester prepared with a dicarboxylic acid selected from the group consisting of terephthalic acid, isophthalic acid, phthalic acid, naphthalene dicarboxylic acid, succinic acid, glutaric acid, adipic acid, azelaic acid, sebacic acid, fumaric acid, maleic acid, itaconic acid, 1,4-cyclohexane acid, sodiosulfoisophthalic acid, and mixtures thereof and prepared with a glycol selected from the group consisting of ethylene glycol, propylene glycol, butanediol, pentanediol, hexanediol, 1,4-cyclohexanedimethanol, diethylene glycol, polyethylene glycol, and mixtures thereof.

8. A shaped article according to claim 6, wherein said continuous oriented thermoplastic polymer phase is a polyolefin selected from the group consisting of polymethylpentene polyethylene, polymethylpentene, and mixtures of copolymers thereof.

9. A shaped article according to claim 6, wherein said continuous oriented thermoplastic polymer phase is a polyamide selected from the group consisting of nylon 6, nylon 66, and mixtures or copolymers thereof.

10. A shaped article according to claim 6, wherein said continuous oriented thermoplastic polymer phase is a cellulosic ester selected from the group consisting of cellulose nitrate, cellulose triacetate, cellulose diacetate, cellulose acetate propionate, cellulose acetate butyrate, and mixtures or copolymers thereof.

11. A shaped article according to claim 1 wherein said microbeads have an average diameter of about 0.1-50 microns.

12. A shaped article according to claim 1 wherein said void spaces surround said microbeads, said void spaces being oriented such that they lie in generally the same or parallel planes.

13. A paper-like sheet comprising a continuous matrix of oriented thermoplastic polymer having dispersed therein microbeads of cross-linked polymer which are encircled by void space, formed from substantially closed cells so that substantially no open fluid transport path extends across opposed sides of said sheet when viewed in a direction perpendicular to the plane of the sheet, wherein the microbeads are prepared by a limited coalescence process so that the microbeads have a narrow size distribution.

14. A paper-like sheet according to claim 13, wherein said microbeads are coated with a slip agent.

15. A paper-like sheet according to claim 14 wherein said slip agent is selected from silica and alumina.

16. A paper-like sheet according to claim 13, wherein said cross-linked polymer comprises polymerizable organic material which is a member selected from the group consisting of an alkenyl aromatic compound having the general formula $$Ar-\underset{\underset{R}{|}}{C}=CH_2$$

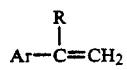

wherein Ar represents an aromatic hydrocarbon radical, or an aromatic halohydrocarbon radical of the benzene series and R is hydrogen or the methyl radical; acrylate-type monomers including monomers of the formula $$CH_2=\underset{\underset{R'}{|}}{C}-\overset{\overset{O}{\|}}{C}-OR$$

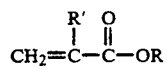

wherein R is selected from the group consisting of hydrogen and an alkyl radical containing from about 1 to 12 carbon atoms and R' is selected from the group consisting of hydrogen and methyl; copolymers of vinyl chloride and vinylidene chloride, acrylonitrile and vinyl chloride, vinyl bromide, vinyl esters having the formula $$CH_2=CH-O-\overset{\overset{O}{\|}}{C}-R$$

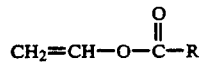

wherein R is an alkyl radical containing from 2 to 18 carbon atoms; acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series $HO(CH_2)_nOH$ wherein n is a whole number within the range of 2-10 and having reactive olefinic linkages within the polymer molecule, the hereinabove described polyesters which include copolymerized therein up to 20 percent by weight of a second acid or ester thereof having reactive olefinic unsaturation and mixtures thereof, and a cross-linking agent selected from the group consisting of divinylbenzene, diethylene glycol dimethacrylate, diallyl fumarate, diallyl phthalate, and mixtures thereof.

17. A paper-like sheet according to claim 13, wherein said continuous oriented thermoplastic polymer phase is selected from the group consisting of polyolefins, polyamides, polycarbonates, cellulosic esters, polystyrene, polyvinyl resins, polysulfonamides, polyethers, polyimides, polysulfonates, polyvinylidene fluoride, polyurethanes, polyphenylenesulfides, polytetrafluoroethylene, polyacetals, and copolymers or mixtures thereof or copolymers or mixtures with polyesters.

18. A paper-like sheet according to claim 13, wherein said continuous matrix of oriented thermoplastic polymer is a polyester.

19. A method of forming a shaped article having at least one major surface comprising a continuous phase of oriented thermoplastic polymer having dispersed therein microbeads comprising a crosslinked polymer and at least partially bordered by void space oriented generally flatwise with respect to said major surface of said shaped article, said method comprising:
  forming cross-linked polymer microbeads in a limited coalescence process;
  mixing a molten continuous-phase polymer and said microbeads to disperse the microbeads uniformly throughout the continuous-phase polymer;
  forming a shaped article from the mixture of the microbeads and the continuous-phase polymer; and
  orienting said article by stretching at least in one direction to from voids at least partially bordering on said microbeads on sides thereof in the direction(s) of orientation, wherein the voids are formed from substantially closed cells so that substantially no open fluid transport path extends across opposed sides of said article.

20. A method according to claim 19, wherein said continuous oriented thermoplastic polymer phase is selected from the group consisting of polyester polyolefins, polyamides, polycarbonates, cellulosic esters, polystyrene, polyvinyl resins, polysulfonamides, polyethers, polyimides, polysulfonates, polyvinylidene fluoride, polyurethanes, polyphenylenesulfides, polytetrafluoroethylene, polyacetals, and copolymers or mixtures thereof or copolymers or mixtures with polyesters.

21. A method according to claim 20, wherein said continuous oriented thermoplastic polymer phase is a polyolefin selected from the group consisting of polypropylene, polyethylene, polymethylpentene, and mixtures or copolymers thereof.

22. A method according to claim 20, wherein said continuous oriented thermoplastic polymer phase is a polyamide selected from the group consisting of nylon 6, nylon 66, and mixtures or copolymers thereof.

23. A method according to claim 20, wherein said continuous oriented thermoplastic polymer phase is a cellulosic ester selected from the group consisting of cellulose nitrate, cellulose triacetate, cellulose diacetate, cellulose acetate propionate, cellulose acetate butyrate, and mixtures or copolymers thereof.

24. A method according to claim 20, wherein said continuous oriented thermoplastic polymer is a polyester prepared with a dicarboxylic acid selected from the group consisting of terephthalic acid, isophthalic acid, phthalic acid, naphthalene dicarboxylic acid, succinic acid, glutaric acid, adipic acid, azelaic acid, sebacic acid, fumaric acid, maleic acid, itaconic acid, 1,4-cyclohexane acid, sodiosulfoisophthalic acid, and mixtures thereof and prepared with a glycol selected from the group consisting of ethylene glycol, propylene glycol, butanediol, pentanediol, hexanediol, 1,4-cyclohexanedimethanol, diethylene glycol, polyethylene glycol, and mixtures thereof.

25. A method according to claim 19, wherein said microbeads are coated with a slip agent.

26. A method according to claim 19, wherein said cross-linked polymer comprises polymerizable organic material which is a member selected from the group consisting of an alkenyl aromatic compound having the general formula

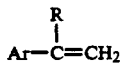

wherein Ar represents an aromatic hydrocarbon radical, or an aromatic halohydrocarbon radical of the benzene series and R is hydrogen or the methyl radical; acrylate-type monomers including monomers of the formula

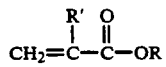

wherein R is selected from the group consisting of hydrogen and an alkyl radical containing from about 1 to 12 carbon atoms and R' is selected from the group consisting of hydrogen and methyl; copolymers of vinyl chloride and vinylidene chloride, acrylonitrile and vinyl chloride, vinyl bromide, vinyl esters having the formula

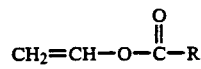

wherein R is an alkyl radical containing from 2 to 18 carbon atoms; acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series $HO(CH_2)_nOH$ wherein n is a whole number within the range of 2–10 and having reactive olefinic linkages within the polymer molecule, the hereinabove described polyesters which include copolymerized therein up to 20 percent by weight of a second acid or ester thereof having reactive olefinic unsaturation and mixtures thereof, and a cross-linking agent selected from the group consisting of divinylbenzene, diethylene glycol dimethacrylate, diallyl fumarate, diallyl phthalate, and mixtures thereof.

27. A method according to claim 19, wherein said forming cross-linked polymer microbeads comprises:
  dispersing a polymerizable liquid in an aqueous liquid medium to form a dispersion of droplets;
  allowing the dispersed droplets to undergo limited coalescence to a substantially uniform size; and
  polymerizing said polymerizable liquid.

28. A method according to claim 27 further comprising:
  stabilizing the dispersed droplets after undergoing limited coalescence and prior to said polymerizing from further coalescence by addition of a thickening agent.

29. A method according to claim 28, wherein said polymerizable liquid comprises at least one polymerizable monomer, and said aqueous liquid comprises a colloidal suspension, water, and a promoter.

30. A method according to claim 29, wherein said colloidal suspension comprises silica and/or alumina.

31. A method of forming a paper-like sheet comprising a continuous phase of oriented thermoplastic polymer having dispersed microbeads of cross-linked polymer encircled by void spaces when viewed in a direction perpendicular to that of the sheet, said method comprising:
forming cross-linked polymer microbeads in a limited coalescence process;
mixing a molten continuous phase polymer and said microbeads to disperse the microbeads uniformly throughout the continuous polymer;
casting a film from said mixture; and
orienting said article by stretching in at least one direction to form voids at least partially bordering on said microbeads on sides thereof in direction(s) of orientation, wherein the voids are formed from substantially closed cells so that substantially no open fluid transport path extends across opposed sides of said article.

32. The method of claim 31, wherein said crosslinked polymer comprises polymerizable organic material which is a member selected from the group consisting of an alkenyl aromatic compound having the general formula

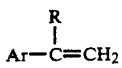

wherein Ar represents an aromatic hydrocarbon radical, or an aromatic halohydrocarbon radical of the benzene series and R is hydrogen or the methyl radical; acrylate-type monomers include monomers of the formula

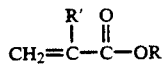

wherein R is selected from the group consisting of hydrogen and an alkyl radical containing from about 1 to 12 carbon atoms and R' is selected from the group consisting of hydrogen and methyl; copolymers of vinyl chloride and vinylidene chloride, acrylonitrile and vinyl chloride, vinyl bromide, vinyl esters having the formula

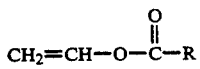

wherein R is an alkyl radical containing from 2 to 18 carbon atoms; acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series $HO(CH_2)_nOH$ wherein n is a whole number within the range of 2-10 and having reactive olefinic linkages within the polymer molecule, the hereinabove described polyesters which include copolymerized therein up to 20 percent by weight of a second acid or ester thereof having reactive olefinic unsaturation and mixtures thereof, and a cross-linking agent selected from the group consisting of divinylbenzene, diethylene glycol dimethacrylate, oiallyl fumarate, diallyl phthalate and mixtures thereof.

33. A method according to claim 31, wherein said microbeads are coated with a sip agent.

34. A method according to claim 31, wherein said forming cross-linked polymer microbeads comprises:
dispersing a polymerizable liquid in an aqueous liquid medium to form a dispersion of droplets;
allowing the dispersed droplets to undergo limited coalescence to a substantially uniform size; and
polymerizing said polymerizable liquid.

35. A method according to claim 34 further comprising:
stabilizing the dispersed droplets after undergoing limited coalescence and prior to said polymerizing from further coalescence by addition of a thickening agent.

36. A method according to claim 35, wherein said polymerizable liquid comprises at least one polymerizable monomer, and said aqueous liquid comprises a colloidal suspension, water, and a promoter.

37. A method according to claim 36, wherein said colloidal suspension comprises silica and/or alumina.

38. A method according to claim 31, wherein said continuous phase of oriented thermoplastic polymer is selected from the group consisting of polyesters, polyolefins, polyamides, polycarbonates, cellulosic esters, polystyrene, polyvinyl resins, polysulfonamides, polyethers, polyimides, polysulfonates, and copolymers and mixtures thereof.

39. A method according to claim 38, wherein said continuous phase of oriented thermoplastic polymer is a polyester or polypropylene.

* * * * *